United States Patent [19]

Alexeff

[11] Patent Number: 5,766,425
[45] Date of Patent: Jun. 16, 1998

[54] METHOD AND APPARATUS FOR TREATING THE SURFACE OF A WEB OR FILM, AND WEBS AND FILMS TREATED THEREWITH

[75] Inventor: Igor Alexeff, Oak Ridge, Tenn.

[73] Assignee: The University of Tennessee Research Corporation, Knoxville, Tenn.

[21] Appl. No.: 592,653

[22] Filed: Jan. 26, 1996

[51] Int. Cl.$^6$ .................... B29C 71/04; B32B 33/00
[52] U.S. Cl. .................... 204/165; 204/168; 264/446; 264/448; 264/484; 361/225; 361/233; 361/234; 442/301; 442/414
[58] Field of Search .................... 204/165, 168; 264/446, 448, 484; 361/225, 233, 234; 442/414, 301

[56] References Cited

U.S. PATENT DOCUMENTS

| | | | |
|---|---|---|---|
| 5,401,446 | 3/1995 | Tsai et al. | 204/165 |
| 5,409,766 | 4/1995 | Yuasa et al. | 156/167 |
| 5,486,411 | 1/1996 | Hassenboehler | 428/311.5 |

*Primary Examiner*—James C. Cannon
*Attorney, Agent, or Firm*—Weiser & Associates, P.C.

[57] ABSTRACT

The surface of a web or film is modified to impart the material with improved properties including wettability, printability, adhesion and static reduction. Such surface modification is achieved with an electrode structure which causes a filamentary discharge to pass generally horizontally across a surface of the electrode structure. A substrate to be treated is then positioned adjacent to the surface of the electrode structure so that the filamentary discharge is caused to flow horizontally across the surface of the substrate, in turn modifying the surface of the substrate and achieving the desired improvement in properties.

66 Claims, 2 Drawing Sheets

5,766,425

METHOD AND APPARATUS FOR TREATING THE SURFACE OF A WEB OR FILM, AND WEBS AND FILMS TREATED THEREWITH

BACKGROUND OF THE INVENTION

The present invention relates generally to a method and apparatus for treating the surfaces of various webs and films with an electric discharge, and to the treated webs and films which are produced.

Various webs and films have been electrically charged to enhance one or more properties of the web or film being treated. This would include the electrostatic surface treatment of various webs and films to enhance properties such as wettability, printability, adhesion and static reduction, among others. This would further include various corona treatments which have been proposed to achieve such results.

One such method, and an apparatus for performing such a method, is disclosed in U.S. Pat. No. 5,401,446 (Tsai et al.). The disclosed method and apparatus are primarily directed to improvements in filtration, and to this end, the desired substrate (web or film) is cold charged by sequentially subjecting the web or film to a series of electrostatic discharges such that adjacent discharges have substantially opposite polarities with respect to each other.

Generally speaking, such improvements are achieved by directing a web or film which is to be electrically charged between a coupled pair of conducting bodies. One of the conducting bodies can, if desired, serve to direct the web or film through the charging apparatus. The other conducting body operates to develop a potential difference such that ionization and corona occurs. In this way, an electrostatic discharge is created between the conducting bodies, through which the web or film can pass to receive its desired treatment.

Such methods have served well to greatly improve the filtration properties of webs and films. However, a corresponding concern which remains to be addressed is improvement of the wettability of such webs and films, and the development of an appropriate surface treatment for accomplishing such a result.

SUMMARY OF THE INVENTION

It is therefore the primary object of the present invention to provide a surface treatment for enhancing the properties of various webs and films.

It is also an object of the present invention to provide a surface treatment for enhancing the properties of various webs and films including wettability, printability, adhesion and static reduction, among others.

It is also an object of the present invention to provide a corona discharge for treating the surfaces of various webs and films to enhance their properties.

It is also an object of the present invention to provide webs and films having surfaces which are treated to improve their properties.

These and other objects which will become apparent are achieved in accordance with the present invention by suitably modifying the surface of the web or film which is being treated. This results in modification of the material forming the web or film to impart the material with the improved properties which are desired. Primarily, the webs and films which are to be treated in accordance with the present invention will be comprised of plastic materials, either alone or as composites, and may further include layers of natural fibers as well. For purposes of describing the improvements of the present invention, such webs and films (irrespective of the material and/or materials which form them, or their number of layers) will generally be referred to as a "substrate", it being understood that the improvements to be described will find applicability to a wide variety of web and film configurations, either presently existing or to be developed.

In accordance with the present invention, such surface modification is achieved with an electrode structure which causes an electric field/current (hereafter, a discharge) to pass generally horizontally across a surface of the electrode structure. A substrate to be treated is then positioned adjacent to the surface of the electrode structure, in turn causing the discharge to flow horizontally across the surface of the substrate. This, in turn, operates to modify the surface of the substrate, achieving an improvement in desired properties as a result.

For further detail regarding the method and apparatus of the present invention, and the improved substrates which can result from such treatment, reference is made to the detailed description which is provided below, taken in conjunction with the following illustrations.

DETAILED DESCRIPTION OF PREFERRED EMBODIMENTS

Figure 1:
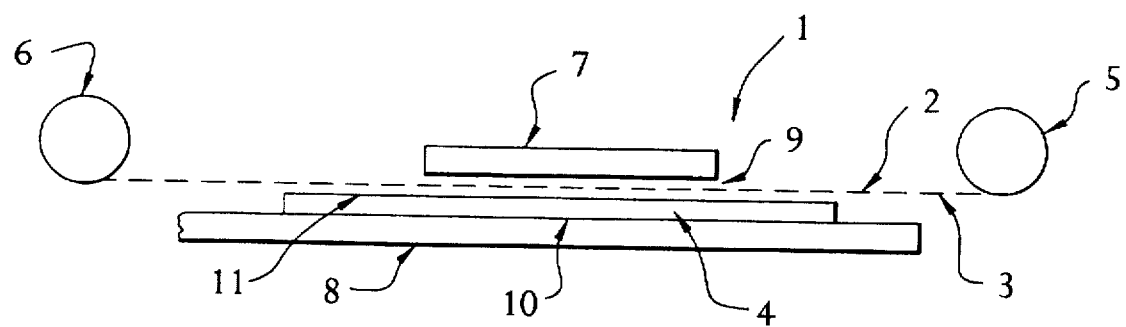
FIG. 1 is an elevational view of an apparatus for implementing the treatment method of the present invention.

FIG. 1 schematically illustrates an apparatus 1 for treating the surfaces 2, 3 of a substrate 4 (i.e., a web or a film formed of a desired material or materials) in accordance with the present invention. Generally speaking, the substrate 4 is passed horizontally through the apparatus 1, as illustrated in the figure, preferably on a continuous basis. Various expedients may be used to assist in this process, such as the feed spool 5 and take-up spool 6 which are schematically illustrated in the figure, as well as either paired or individual guide rollers (not shown) for directing the web 4 through the apparatus 1 as will be discussed more fully below.

It was previously known that certain properties of a substrate, particularly its filtration ability, could be improved by subjecting the substrate to desired electrostatic charging. However, it has been found that other (additional) measures are necessary to treat the substrate to improve its wettability. In accordance with the present invention, it has been found that such a result can be achieved by modifying the surface of the substrate, which can be accomplished in addition to treatment of the substrate with an electrostatic discharge.

Because the intended effect of a treatment in accordance with the present invention is to actually modify the surface of the substrate, as distinguished from electrostatic treatment of the substrate, it has been found that treatment with an alternating current (AC) is suitable for achieving an appropriate result in accordance with the present invention. A direct current (DC) is not necessary to achieving an appropriate result. Since alternating current has the ability to pass through dielectrics (by capacitive induction), it has been found to be particularly advantageous to provide the treatment apparatus of the present invention with a dielectric medium such as glass, mica, fused quartz, ceramics, synthetic sapphire, or other electrically resistant material which exhibits low expansion and low heat conduction. This operates to prevent potentially adverse effects, such as "spark-overs", while achieving appropriate surface modification of the treated substrate. Irrespective of the material used, the thickness of the dielectric medium is preferably kept to a minimum to increase the overall efficiency of the resulting discharge.

An apparatus 1 for achieving the foregoing result is shown in FIG. 1 of the drawings, and generally includes a plate electrode 7 in combination with an opposing metal plate 8. The plate electrode 7 and the metal plate 8 combine to define a space 9 for receiving the substrate 4 which is to be treated. An appropriate AC current is applied to the plate electrode 7, in turn developing a filamentary discharge which has been found to progress generally horizontally along (parallel with) the plate electrode 7, adjacent to the metal plate 8. As a result, this discharge is caused to pass generally horizontally along the surface 3 of the substrate 4, modifying the surface 3 so as to improve desired properties of the treated substrate 4. The opposing surface 2 of the substrate 4 may be similarly treated, if desired, by reversing (inverting) the substrate 4 and again passing the substrate 4 between the plate electrode 7 and the metal plate 8 as previously described, or by using a second treatment apparatus 1 suitably positioned to treat the opposing surface 2 of the substrate 4.

As previously indicated, a dielectric plate 10 is preferably disposed over the metal plate 8 so that the substrate 4 passes between the plate electrode 7 and the dielectric plate 10. Since alternating current is capable of passing through a dielectric medium by capacitive induction, the main discharge resulting from the apparatus 1 will tend to pass horizontally over the surface 11 of the dielectric plate 10 (again modifying the surface 3 of the substrate 4, as previously described). This permits desired surface modification of the substrate 4, while avoiding the potential for damage to the substrate 4 resulting from effects such as spark-over and the like.

An advantage of the treatment method of the present invention is its ability to use a wide variety of current sources, including the more readily available and relatively inexpensive alternating current sources. For example, while current sources operating at frequencies as low as 25 Hz and as high as 10 kHz (i.e., a frequency appropriate to maintain a filamentary discharge and not a plasma discharge) may be effectively used in accordance with the present invention, conventional (60 Hz) current operating in air can be used to achieve a satisfactory result, if desired.

The power requirements for implementing such a method may also be varied freely to suit a particular application. As an example, and for a typical working (surface) area of 100 cm², currents of from 1 µA to 1 mA, at voltages of from 1 kV to 30 kV, may be used to yield an appropriate current density. A current of about 2 µA at a voltage of about 6 kV has been found to yield a particularly useful result (again, for a typical surface area of 100 cm²). This results in a power utilization on the order of 12 mW, which tends to illustrate the economy of the method of the present invention.

The apparatus shown in FIG. 1 of the drawings has been used to treat polypropylene webs, and has yielded webs of improved wettability. The treatment of both meltblown and spunbond polypropylene webs has been performed, and has achieved a useful result. During such experimentation, the apparatus 1 (at the above-specified power levels) was used to expose the polypropylene webs to a developed electrostatic discharge for periods of time varying between 10 and 60 seconds. A reliefed surface (in this experiment, a quarter) was used as the plate electrode 7. It was found that an image of the quarter was imparted to the web following such exposure. While such images were not initially visible to the eye, such images became clearly visible when wetted. Upon exposure for 60 seconds (the maximum exposure of the experiment), the resulting material was easily soaked, but only where treated (i.e., the raised portions of the reliefed electrode). Subsequently, the web was dried and rewetted. The images reappeared, establishing the permanence of the surface treatment achieved in accordance with the present invention. Such treatment was found to be permanent both at its inception (e.g., the first several days), and for several months thereafter.

In an effort to investigate the phenomenon which results in such surface treatment, the surface discharges produced with the above-described apparatus were studied in a darkroom environment. Photographs were taken in a darkroom, and at night, for a period of about 10 minutes and using a high-speed film with an open f/1.2 camera lens. The resulting discharge was non-luminous in roomlight. However, following such photographic exposure, a discharge composed of small sparks was found to emanate from the plate electrode 7, some of which extended from the edges of the plate electrode 7. This, in turn, produces a filamentary discharge in the treated fabric, which in turn results in desired surface modification of the fabric.

Figure 2:
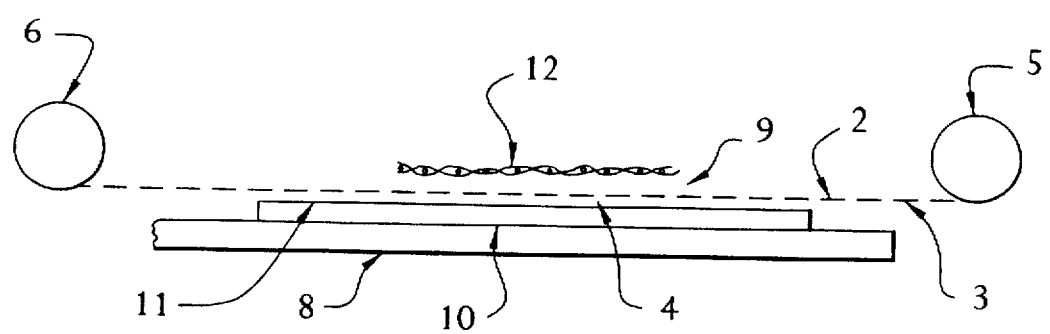
FIG. 2 is an elevational view similar to FIG. 1, showing an alternative embodiment apparatus for implementing the treatment method of the present invention.

In the course of such experimentation it was found that under certain circumstances, discharges produced in accordance with the present invention would yield a "spotty" result (i.e., irregular wettability) for short-term discharges. It is believed that such spottiness is caused by small defects on the surface of the (metal) plate electrode 7. In such cases, and to remove potentially spotty effects, it has been found that the plate (solid) electrode 7 of FIG. 1 can be replaced with a wire mesh electrode 12, as shown in FIG. 2 of the drawings. It is believed that the more "irregular" wire mesh tends to cancel the irregularities resulting from the small defects of a planar (plate) surface, leading to significant improvements in the resulting discharge. For optimum uniformity, the wire mesh electrode 12 should be moving during such exposure. The use of a wire mesh electrode 12 formed of tungsten wool has been found to provide a suitable result. However, any electrode having an irregular (non-smooth) surface should provide a similar result. This could even include composite structures, such as a glass plate bearing metal particles, although the use of a glass plate could potentially reduce the resulting discharge and is presently considered to be less preferred.

Figure 3:
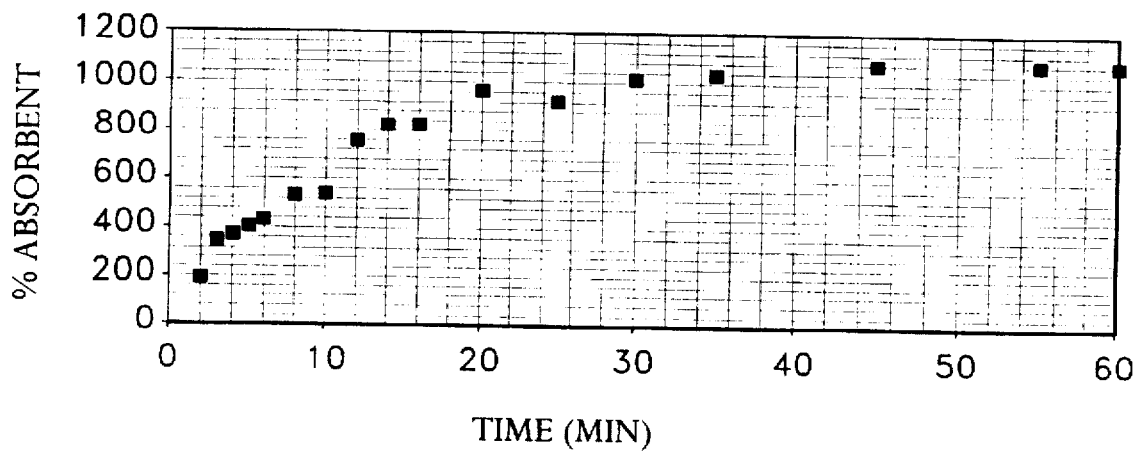
FIG. 3 is a graph showing absorbency as a function of time for a typical substrate which has been treated in accordance with the present invention.

FIG. 3 further illustrates the improved properties which are achieved in accordance with the present invention, showing the absorbency of a typical treated substrate (in this case, the water absorbency of a treated polypropylene web) over time. A fast rate of absorbance is apparent from the data which is shown (e.g., a 200% absorbency after only 2 minutes), as is a high rate of absorbance (e.g., a 1000% absorbency after 20 minutes). Permanence is also apparent from the data given (a maintained, high absorbency after 20 minutes and up to one hour). In addition to high absorbency (speed of take-up), substrates treated in accordance with the present invention can exhibit rapid dumping rates (speed of water loss), and will exhibit widely varying dumping rates depending upon the material and the make-up of the substrate which has been treated, and the conditions under which such treatment has been performed. This allows substrates treated in accordance with the present invention to be used in a wide variety of applications. As an example, fast and high absorbency rates combined with rapid dumping rates, such as are achievable in accordance with the present invention, are particularly useful in taking up radioactive waste. Polymeric materials treated in accordance with the present invention are further useful in taking up radioactive waste since the incineration of such materials leaves no ash (an undesirable by-product), as would cotton or an organic material.

Figure 4:
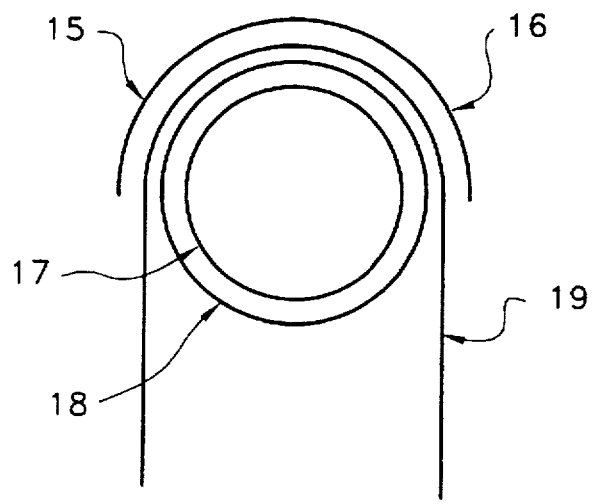
FIG. 4 is an elevational view of an alternative embodiment apparatus for implementing the treatment method of the present invention for large-scale applications.

FIG. 4 shows an alternative embodiment treatment apparatus 15 which is suggested for larger scale applications (such as industrial and/or production applications). In this embodiment, the previously discussed, flat plate electrode structures are replaced by curvilinear structures. For example, the previously described plate electrode 7 is replaced by a semi-cylindrical shell 16. The corresponding metal plate 8 is replaced by a cylindrical drum 17. The dielectric plate 10 is advantageously replaced by a dielectric coating 18 provided on the surface of the drum 17, yielding a continuous outer surface for receiving a substrate 19 to be treated.

Operation of the treatment apparatus 15 of FIG. 4 proceeds similarly to operation of the treatment apparatus 1 of FIG. 1. However, in the case of the treatment apparatus 15, the resulting discharge will progress (tangentially) along the cylindrical surfaces of the treatment apparatus 15, passing generally horizontally along the substrate 19 as it travels through the treatment apparatus 15. The advantage of the apparatus 15 of FIG. 4 is that the improvements of the present invention are achieved with cylindrical structures which are capable of operating at a higher rate of speed, and which are therefore better suited to large-scale applications. As with the apparatus 1 of FIG. 1, the opposing sides of a substrate 19 may be treated with the apparatus 15 of FIG. 4 either by inverting the substrate 19, and by then passing the inverted substrate through the same treatment apparatus 15 or a second, similarly configured treatment apparatus 15, or by passing the substrate 19 (without inversion) to a second, similarly configured treatment apparatus 15 suitably positioned to treat the remaining (untreated) side of the substrate 19.

If desired, irregular surface structures such as are described in conjunction with the treatment apparatus of FIG. 2, may also be used as the shell electrode 16 of the treatment apparatus 15 of FIG. 4. In operation, the web 19 will be spaced from, and in near contact with the drum 17 (by the dielectric coating 18), and the shell electrode 16 will be spaced from, but relatively close to the web 19 and the drum 17 which receives it. As a result, a high-voltage alternating current will produce the same small sparks as were produced in conjunction with the planar electrode structures of the apparatus 1 of FIG. 1, spreading over the insulating surface and passing through the fabric, and modifying the fabric as a result. The drum 17 is preferably grounded so that rotation of the drum causes no adverse effects (e.g., high-voltage problems).

As previously indicated, and in accordance with the present invention, any of a variety of substrates (including webs, films and equivalent structures) can be treated to achieve improved properties. The resulting surface modification can provide treated substrates with improved wettability, as previously mentioned. Such surface modification can also provide improvements in other useful properties such as printability, adhesion and static reduction, among others.

The present invention is useful for treating any of a variety of materials including both woven and nonwoven webs and films, prepared from nonconductive polymeric materials such as polypropylene (PP), recycled and virgin polyethylene terephthalate (PET), all types of polyethylene (PE), such as linear low density polyethylene (LLDPE), polybutylene terephthalate (PBT), polycarbonates, polychlorotrifluoroethylene (PCTFE) and polycyclohexyldimethylene terephthalate (PCT). In addition, the method and apparatus of the present invention are useful for treating composite webs containing both conductive and nonconductive fibers such as meltblown/cotton/meltblown thermally bonded webs or meltblown/cotton hydroentangled or needle-punched webs, hydroentangled mixtures of carded polyester staple fibers and wood tissue, such as SONTARA webs (Dupont), or mixtures of polyolefins, at least one of which is preferably modified with acrylic acid or some other anionic or cationic groups. Laminated webs of various types may similarly be treated in accordance with the present invention to yield an improved result. Such laminates and composites may be implemented in various combinations including meltblown web/meltblown web (different webs), meltblown webs/other nonwoven web (e.g., spunbond, hydroentangled, etc.), as well as thermoplastic/nonthermoplastic combinations. Other materials and combinations of materials will occur to those of ordinary skill in this art.

It will therefore be understood that various changes in the details, materials and arrangement of parts which have been herein described and illustrated in order to explain the nature of this invention may be made by those skilled in the art within the principle and scope of the invention as expressed in the following claims.

What is claimed is:

1. A method for treating a surface of a substrate formed as a web or film, comprising the steps of:

electrically exciting a spaced pair of electrode structures with alternating current thereby causing an electric field to pass between electrode surfaces of the electrode structures; and passing the substrate between the electrode structures to cause a discharge to flow generally across and substantially parallel to the surface of the substrate to effect long-acting modification of the surface of the substrate while minimizing spark-over as the substrate passes between the electrode structures.

2. The method of claim 1 which further comprises the step of isolating one of the spaced electrode structures by positioning a dielectric material between the spaced electrode structures and adjacent to said one of the spaced electrode structures.

3. The method of claim 1 wherein the spaced electrode structures are excited at a frequency of from 25 Hz to 10 kHz.

4. The method of claim 3 wherein the frequency is about 60 Hz.

5. The method of claim 3 wherein the spaced electrode structures are excited with a current of from 1 µA to 1 mA.

6. The method of claim 5 wherein the current is about 2 µA.

7. The method of claim 5 wherein the spaced electrode structures are excited at a voltage of from 1 kV to 30 kV.

8. The method of claim 7 wherein the voltage is about 6 kV.

9. The method of claim 7 wherein the substrate is exposed to the electric field for from 10 to 60 seconds.

10. The method of claim 1 which further comprises the step of transporting the substrate between the spaced electrode structures.

11. The method of claim 10 wherein the substrate is linearly transported between planar electrode structures.

12. The method of claim 10 wherein the substrate is tangentially transported between curvilinear electrode structures.

13. The method of claim 10 wherein the substrate is continuously transported between the spaced electrode structures.

14. The method of claim 1 which further comprises the step of exciting an irregular electrode structure forming one of the spaced electrode structures.

15. The method of claim 14 which further comprises the step of moving the irregular electrode structure.

16. The method of claim 1 wherein the substrate is a woven or nonwoven web or film formed of a nonconductive polymeric material selected from the group consisting of polypropylene (PP), recycled and virgin polyethylene terephthalate (PET), polyethylene (PE), including linear low density polyethylene (LLDPE), polybutylene terephthalate (PBT), polycarbonates, polychlorotrifluoroethylene (PCTFE) and polycyclohexyldimethylene terephthalate (PCT).

17. The method of claim 16 wherein the substrate is a multilayered structure.

18. The method of claim 17 wherein the multilayered structure is a composite web or film.

19. The method of claim 17 wherein the multilayered structure is a laminate.

20. The method of claim 1 which further includes the steps of treating a first surface of the substrate, and thereafter treating a second surface of the substrate, opposite to the first surface.

21. A substrate formed of a material which exhibits an increased wettability after treatment according to the method of claim 1.

22. The substrate of claim 21 wherein the substrate is a woven or nonwoven web or film formed of a nonconductive polymeric material selected from the group consisting of polypropylene (PP), recycled and virgin polyethylene terephthalate (PET), polyethylene (PE), including linear low density polyethylene (LLDPE), polybutylene terephthalate (PBT), polycarbonates, polychlorotrifluoroethylene (PCTFE) and polycyclohexyldimethylene terephthalate (PCT).

23. The substrate of claim 22 wherein the substrate is a multilayered structure.

24. The substrate of claim 23 wherein the multilayered structure is a composite web or film.

25. The substrate of claim 23 wherein the multilayered structure is a laminate.

26. A substrate formed of a material which exhibits an increased printability after treatment according to the method of claim 1.

27. The substrate of claim 26 wherein the substrate is a woven or nonwoven web or film formed of a nonconductive polymeric material selected from the group consisting of polypropylene (PP), recycled and virgin polyethylene terephthalate (PET), polyethylene (PE), including linear low density polyethylene (LLDPE), polybutylene terephthalate (PBT), polycarbonates, polychlorotrifluoroethylene (PCTFE) and polycyclohexyldimethylene terephthalate (PCT).

28. The substrate of claim 27 wherein the substrate is a multilayered structure.

29. The substrate of claim 28 wherein the multilayered structure is a composite web or film.

30. The substrate of claim 28 wherein the multilayered structure is a laminate.

31. A substrate formed of a material which exhibits an increased adhesive ability after treatment according to the method of claim 1.

32. The substrate of claim 31 wherein the substrate is a woven or nonwoven web or film formed of a nonconductive polymeric material selected from the group consisting of polypropylene (PP), recycled and virgin polyethylene terephthalate (PET), polyethylene (PE), including linear low density polyethylene (LLDPE), polybutylene terephthalate (PBT), polycarbonates, polychlorotrifluoroethylene (PCTFE) and polycyclohexyldimethylene terephthalate (PCT).

33. The substrate of claim 32 wherein the substrate is a multilayered structure.

34. The substrate of claim 33 wherein the multilayered structure is a composite web or film.

35. The substrate of claim 33 wherein the multilayered structure is a laminate.

36. A substrate formed of a material which exhibits reduced static after treatment according to the method of claim 1.

37. The substrate of claim 36 wherein the substrate is a woven or nonwoven web or film formed of a nonconductive polymeric material selected from the group consisting of polypropylene (PP), recycled and virgin polyethylene terephthalate (PET), polyethylene (PE), including linear low density polyethylene (LLDPE), polybutylene terephthalate (PBT), polycarbonates, polychlorotrifluoroethylene (PCTFE) and polycyclohexyldimethylene terephthalate (PCT).

38. The substrate of claim 37 wherein the substrate is a multilayered structure.

39. The substrate of claim 38 wherein the multilayered structure is a composite web or film.

40. The substrate of claim 38 wherein the multilayered structure is a laminate.

41. The method of claim 1, wherein one of the electrodes has a reliefed surface causing an image of the reliefed surface to be imparted to the treated substrate.

42. The method of claim 1, wherein one of the electrodes is formed by metal particles deposited on a glass plate.

43. An apparatus for treating a surface of a substrate formed as a web or film, comprising:
   electrode structures spaced relative to one another;
   an alternating current source, connected to at least one of the electrode structures, capable of exciting the electrode structures with alternating current thereby causing an electric field to pass between the electrode structures; and
   means for passing the substrate between the electrode structures so that the substrate is exposed to a discharge that flows generally across and in a direction substantially parallel to the surface of the substrate;
   wherein the discharge is of an intensity sufficient to effect long acting modification of the surface of the substrate while minimizing spark-over as the substrate passes between the electrode structures.

44. The apparatus of claim 43 wherein the alternating current source operates at a frequency of from 25 Hz to 10 kHz.

45. The apparatus of claim 44 wherein the frequency is about 60 Hz.

46. The apparatus of claim 44 wherein the alternating current source produces a current of from 1 µA to 1 mA.

47. The apparatus of claim 46 wherein the current is 2 µA.

48. The apparatus of claim 46 wherein the alternating current source operates at a voltage of from 1 kV to 30 kV.

49. The apparatus of claim 48 wherein the voltage is about 6 kV.

50. The apparatus of claim 48 wherein the current source operates to expose the surface of the substrate for from 10 to 60 seconds.

51. The apparatus of claim 43 wherein the spaced electrode structures are planar electrode structures.

52. The apparatus of claim 51 which further includes a dielectric material positioned on a first one of the spaced electrode structures and located between the spaced electrode structures.

53. The apparatus of claim 52 wherein the alternating current source is connected to a second one of the spaced electrode structures, opposing the dielectric material and the first one of the spaced electrode structures.

54. The apparatus of claim 52 wherein the dielectric material is selected from the group consisting of glass, mica, fused quartz, ceramics and synthetic sapphire.

55. The apparatus of claim 43 wherein the spaced electrode structures are curvilinear electrode structures.

56. The apparatus of claim 55 wherein the spaced electrode structures include a drum for receiving the substrate, and a shell overlying the drum and spaced from the drum.

57. The apparatus of claim 56 wherein the shell is a semi-cylindrical shell uniformly spaced from the drum.

58. The apparatus of claim 56 which further includes a dielectric surface formed on the drum.

59. The apparatus of claim 58 wherein the dielectric surface is formed of a material selected from the group consisting of glass, mica, fused quartz, ceramics and synthetic sapphire.

60. The apparatus of claim 43 wherein said one of the spaced electrode structures which is connected to the alternating current source is an irregular electrode structure.

61. The apparatus of claim 60 wherein the irregular electrode structure is a wire mesh electrode.

62. The apparatus of claim 60 wherein the irregular electrode structure is formed by metal particles deposited on a glass plate.

63. The apparatus of claim 60 wherein the irregular electrode structure is capable of movement during exposure of the substrate.

64. The apparatus of claim 43 wherein the substrate is a continuous material, and wherein the substrate is continuously transported between the spaced electrode structures.

65. The apparatus of claim 43, wherein one of the electrodes has a reliefed surface for causing an image of the reliefed surface to be imparted to the treated substrate.

66. The apparatus of claim 43, wherein one of the electrodes is formed by metal particles deposited on a glass plate.

* * * * *